(12) United States Patent
Karlsson et al.

(10) Patent No.: US 6,567,376 B1
(45) Date of Patent: May 20, 2003

(54) USING SYSTEM FRAME NUMBER TO IMPLEMENT TIMERS IN TELECOMMUNICATIONS SYSTEM HAVING REDUNDANCY

(75) Inventors: Marcus Karlsson, Luleå (SE); Patrik Rynbäck, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/443,154

(22) Filed: Nov. 18, 1999

Related U.S. Application Data (63) Continuation-in-part of application No. 09/257,233, filed on Feb. 25, 1999, now Pat. No. 6,470,462.

(51) Int. Cl.[7] ................................................. H04J 1/16
(52) U.S. Cl. ........................................ 370/216; 370/503
(58) Field of Search .............................. 714/2, 11, 10; 700/82, 79; 709/200, 213; 370/216, 503, 504, 506, 508, 509, 510, 511, 512, 513, 514, 518, 217, 218, 227, 228, 350, 345; 455/502

(56) References Cited

U.S. PATENT DOCUMENTS

| 3,761,884 | A | | 9/1973 | Avsan et al. | |
|---|---|---|---|---|---|
| 4,180,708 | A | | 12/1979 | Yamaguchi et al. | |
| 4,503,490 | A | | 3/1985 | Thompson | |
| 4,569,017 | A | | 2/1986 | Renner et al. | |
| 4,733,353 | A | | 3/1988 | Jaswa | |
| 4,866,606 | A | | 9/1989 | Kopetz | |
| 5,165,091 | A | * | 11/1992 | Lape et al. | 370/216 |
| 5,301,308 | A | | 4/1994 | Daar et al. | |
| 5,379,326 | A | | 1/1995 | Nakahara et al. | |
| 5,452,441 | A | | 9/1995 | Esposito et al. | |
| 5,469,503 | A | | 11/1995 | Butensky et al. | |
| 5,488,631 | A | * | 1/1996 | Gold et al. | 375/149 |
| 5,530,921 | A | | 6/1996 | Dulong et al. | |
| 5,541,978 | A | | 7/1996 | Brunner et al. | |
| 5,579,220 | A | | 11/1996 | Barthel et al. | |
| 5,583,986 | A | | 12/1996 | Park et al. | |
| 5,740,129 | A | | 4/1998 | Frampton | |
| 5,748,873 | A | | 5/1998 | Ohguro et al. | |
| 5,768,689 | A | | 6/1998 | Borg | |
| 5,787,078 | A | | 7/1998 | Geywitz et al. | |
| 5,805,870 | A | | 9/1998 | Browning | |
| 5,841,963 | A | | 11/1998 | Nakamikawa et al. | |
| 5,845,060 | A | | 12/1998 | Vrba et al. | |
| 5,872,820 | A | | 2/1999 | Upadrasta | |
| 5,963,634 | A | | 10/1999 | Kantola et al. | |
| 6,278,718 | B1 | * | 8/2001 | Eschholz | 370/503 |

FOREIGN PATENT DOCUMENTS

| GB | 2 308 040 A | 6/1997 |
|---|---|---|
| WO | 96/02115 | 1/1996 |
| WO | 99/33207 | 7/1999 |

* cited by examiner

*Primary Examiner*—Dang Ton
(74) *Attorney, Agent, or Firm*—Nixon & Vanderhye, P.C.

(57) ABSTRACT

A wireless communication system utilizes system frame numbers (SFNs) upon which to base identification of frames of information transmitted by the communication system, as well as for expressing timeout values associated with process-set timers. The wireless communication system comprises a first (active) unit (40) which executes an operational process (OP), as well as a second (standby) unit (42) which executes the operational process in redundant manner with the first unit. The operational process sets a timer by computing an expiration system frame number to be used for determining a timeout value. The timer expires when a current system frame number reaches the calculated expiration system frame number. The SFN-based timeout values of the present invention are easily accessible and easily re-established upon reset and resynchronization of one of the redundant units.

26 Claims, 5 Drawing Sheets

USING SYSTEM FRAME NUMBER TO IMPLEMENT TIMERS IN TELECOMMUNICATIONS SYSTEM HAVING REDUNDANCY

This application is a continuation-in-part of U.S. patent application Ser. No. 09/257,233 filed Feb. 25, 1999, now U.S. Pat. No. 6,470,462, entitled "STATE SYNCRHONIZATION IN REDUNDANT SYSTEMS", and is related to, simultaneously-filed U.S. patent application Ser. No. 09/443,208, filed Nov. 18, 1999, entitled "CLOCK SYNCHRONIZATION IN TELECOMMUNICATIONS NETWORK USING SYSTEM FRAME NUMBER", both of which are incorporated by reference in their entirety.

BACKGROUND

1. Field of the Invention

The present invention pertains to wireless communications, and particularly to the coordination of timers maintained by redundant units of a wireless communication system.

2. Related Art and Other Considerations

In certain aspects of wireless communications systems, e.g., mobile telecommunications systems such as a cellular communications network, it is advantageous to have redundancy. That is, for some wireless communications functions it is prudent to have two units or processors performing certain activities, just in case one of the units malfunctions or terminates (e.g., crashes). See, for example, U.S. Pat. No. 5,469,503 which discloses a certain recovery algorithm for a redundant system in a telecommunications environment.

Redundant systems can be built and maintained in various ways. One technique for achieving redundancy is to have the separate units executing the same task or processes, with the separate units being synchronized by receiving external stimuli such as bus events, for example. In this technique, typically one of the units is an active unit which actually performs all the tasks, while the other unit is a standby unit. Although the standby unit also performs all the tasks in synchronized manner with the active unit, the standby unit does not generate any output (e.g., does not generate any bus events).

Typically, in the course of their execution, the processes executed by the redundant units set certain timers. The timers can be used, for example, to ascertain when the process is to perform a certain event or signal another process to perform an event.

When it is detected that one of the redundant units becomes out of synchronization with the other unit, the un-synchronized unit must be reset. The coordinated maintenance the timers of both units is particularly problematic upon reset of one of the redundant units.

A common prior art practice is to implement the timers of the processes executed by the redundant units is by using primitives of the real time operating system (RTOS) for the respective units. In accordance with this RTOS-implemented timer practice, the timers are stored in a private memory of the RTOS of each unit. As a consequence of storage of the timers in the private memory of the RTOS, the contents of the timers cannot be ascertained for the purpose of resynchronization after a reset. Thus, for example, the timer of the active unit cannot be replicated for the standby unit after the standby unit is reset.

Another practice is to employ a timeout server which acts on an interrupt from a system clock to decrease a timer value of a timer. Fortunately, there is full access to data structures of the timeout server, so that the data structures thereof can be utilized for achieving redundancy. But, as a disadvantage, with every pulse of the system clock there is an unnecessary additional processing load on the redundant units. Moreover, there is the further danger that one or more interrupts from the system clock may be missed during a synchronization procedure.

What is needed, therefore, and an object of the present invention, is method and apparatus for implementing timers maintained by redundant units of a wireless communications system.

BRIEF SUMMARY OF THE INVENTION

A wireless communication system utilizes system frame numbers (SFNs) upon which to base identification of frames of information transmitted by the communication system, as well as for expressing timeout values associated with process-set timers. The wireless communication system comprises a first (active) unit which executes an operational process, as well as a second (standby) unit which executes the operational process in redundant manner with the first unit. The operational process sets a timer by computing an expiration system frame number to be used for determining a timeout value. The timer expires when a current system frame number reaches the calculated expiration system frame number.

In one embodiment of the invention, the operational process requests a timer process to store the calculated expiration system frame number in a timer table. The timer process monitors the current system frame number, and when the current system frame number reaches the calculated expiration system frame number, the timer process notifies the operational process. A SFN-distribution unit is employed to distribute a current system frame number to the timer processes of the active unit and the standby unit.

A resynchronization coordination procedure is performed by a resynchronization server. When one of the units (e.g., the standby unit) performing the operational process needs to be reset, during resynchronization the resynchronization server causes the timer table (with its expiration system frame number used for the timeout value for the first unit) to be communicated to the second unit, so that the timers for the second unit can be easily re-established. The SFN-based timeout values of the present invention are thus easily accessible and re-established upon reset.

In one embodiment, the first unit and the second unit reside at a same node of the wireless communications system, e.g., a base station node.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
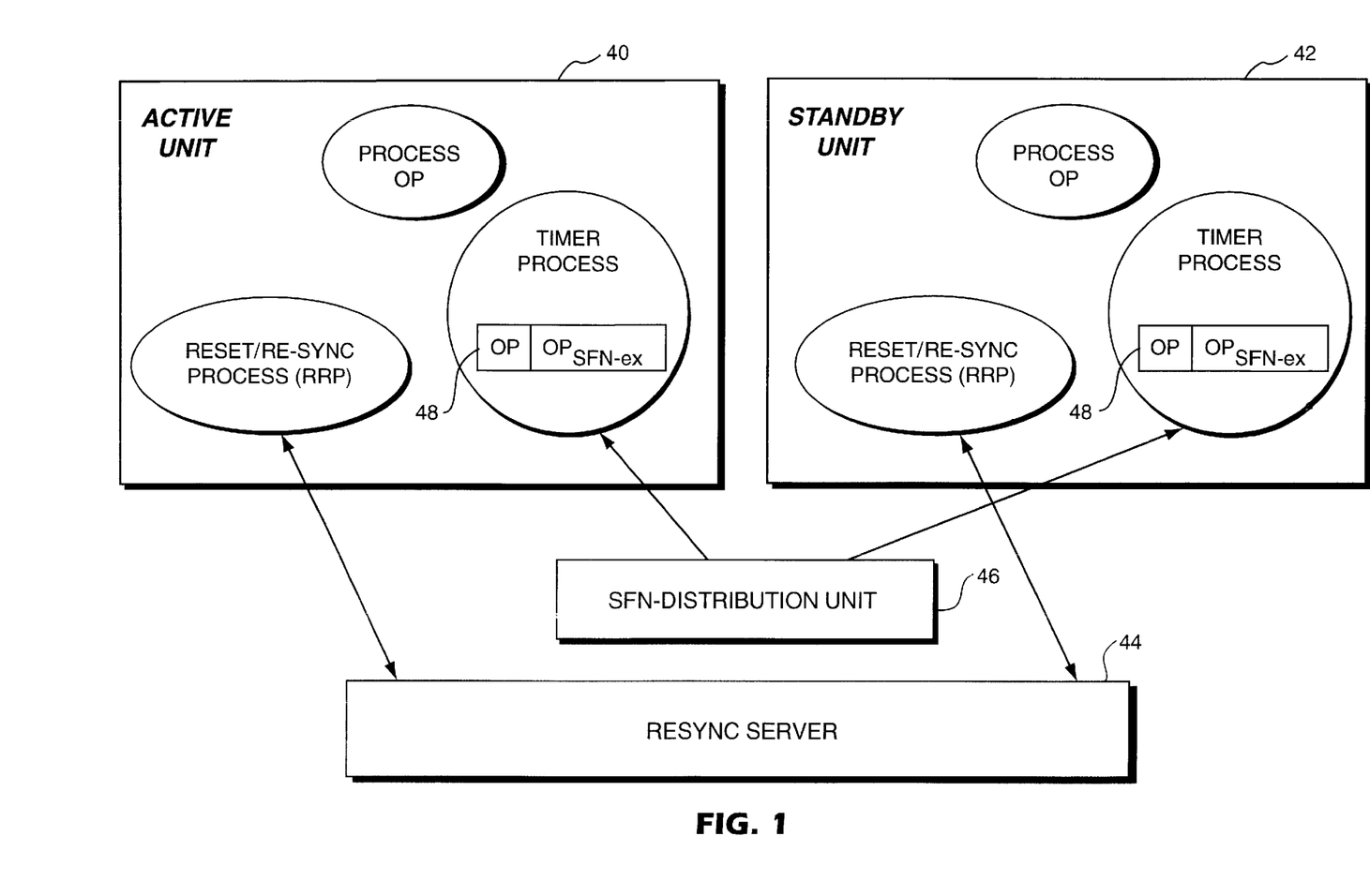
FIG. 1 is a schematic view of portions of a wireless telecommunications system according to an embodiment of the invention.

FIG. 1 shows portions of a wireless telecommunications system, including a first unit 40 (also known as the active unit); a second unit 42 (also known as the standby unit); and, a resynchronization unit or resynchronization server 44. Although non-limiting examples of the first unit 40 and second unit 42 are described subsequently in context of a particular node of the wireless telecommunications system, for the present it is sufficient to state that the first unit 40 and second unit 42 can include any apparatus for performing an operational function germane to wireless telecommunications, such apparatus including, e.g., processor(s) or state machine(s). FIG. 1 illustrates one such operation process, process OP, as being performed by first unit 40 and, in redundant manner, by second unit 42. Moreover, the first unit 40 and second unit 42 each perform certain support processes, examples of support processes pertinent to the present invention being illustrated as timer process TP and reset & resynchronization process RRP.

The wireless telecommunications system of the present invention transmits frames of information on both an uplink and a downlink, the downlink being in a direction toward a mobile user equipment unit (UE) and the uplink being in an opposite direction (e.g., from the mobile user equipment unit (UE) toward the network). Each frame is consecutively numbered to include an identifying frame number (FN). The frame number is, in turned, based on a system frame number (SFN) which, as explained below, is available at pertinent nodes of the wireless telecommunications system. For example, in one embodiment the frame number (FN) is derived from the system frame number (SFN), the frame number being computed as system frame number (SFN) modulo 72 and the system frame number (SFN) being generated every 10 milliseconds.

The system frame number (SFN) is maintained in synchronization by various nodes of the wireless telecommunications system, such as at base stations and a radio network controller (RNC) node. Using the frame number FN and the system frame number (SFN), for example, base station(s) know at precisely what time to send a frame on the downlink to a mobile user equipment unit (UE).

In the above regard, each node has a unit which distributes a current system frame number (SFN), e.g., to other units such as other constituent units (e.g., device boards) of the node. For example, in FIG. 1 such a SFN-distribution unit takes the form of an SFN oscillator 46 which distributes the current system frame number (SFN) to first unit 40 and second unit 42. In the example shown, the current system frame number (SFN) is particularly distributed to the timer processes TP of first unit 40 and second unit 42.

In one example embodiment, the distribution of the current system frame number (SFN) encompasses a situation (such as that of the current example) in which serial packets are sent on a dedicated SFN bus from SFN oscillator 46 to active unit 40 and standby unit 42. Each such packet contains a present SFN value from SFN oscillator 46. When a unit 40 or 42 detects an change in SFN, an interrupt occurs to prompt the unit to perform an appropriate action. For example, an appropriate action for a base station node might be checking to see if there are any frames to send to a mobile station, or whether it is time to perform some action (e.g., performing a handover).

In another example embodiment, the distribution of the current system frame number (SFN) encompasses involves the SFN oscillator 46 sending pulses (at, e.g., 10 millisecond), with both the pulse transmitter (e.g., SFN oscillator 46) and the pulse receiver (e.g. the timer process TP) maintaining a count [the count being the actual current system frame number (SFN)]. When a number of pulses corresponding to a complete set of frames has been issued by the SFN pulse transmitter, counters at both the SFN pulse transmitter and the receiver are reset. The count value for the SFN pulse transmitter can be initialized (or reinitialized) by, e.g., another node (e.g., radio network controller (RNC) node) of the wireless telecommunications system. See, in this and other regards, U.S. patent application Ser. No. 09/443,208 filed Nov. 18, 1999, simultaneously filed), entitled "CLOCK SYNCHRONIZATION IN TELECOMMUNICATIONS NETWORK USING SYSTEM FRAME NUMBER", which is incorporated by reference.

FIG. 1 further shows that the timer process TP has a timer table 48. The timer table 48 has an entry comprising a timer identifier (OP) and a timeout value ($OP_{SFN\text{-}ex}$) associated with the paired timer identifier. As explained below, rather than the timeout value maintained in timer table 48 by timer process TP being a clock time or a value maintained by the real time operating system, the timeout value is based upon system frame number (SFN). In essence, the timeout value stored in timer table 48 is an "expiration" system frame number (SFN) value, e.g., a system frame number (SFN) calculated to correspond to the clock time at which the timer should time out.

Figure 2:
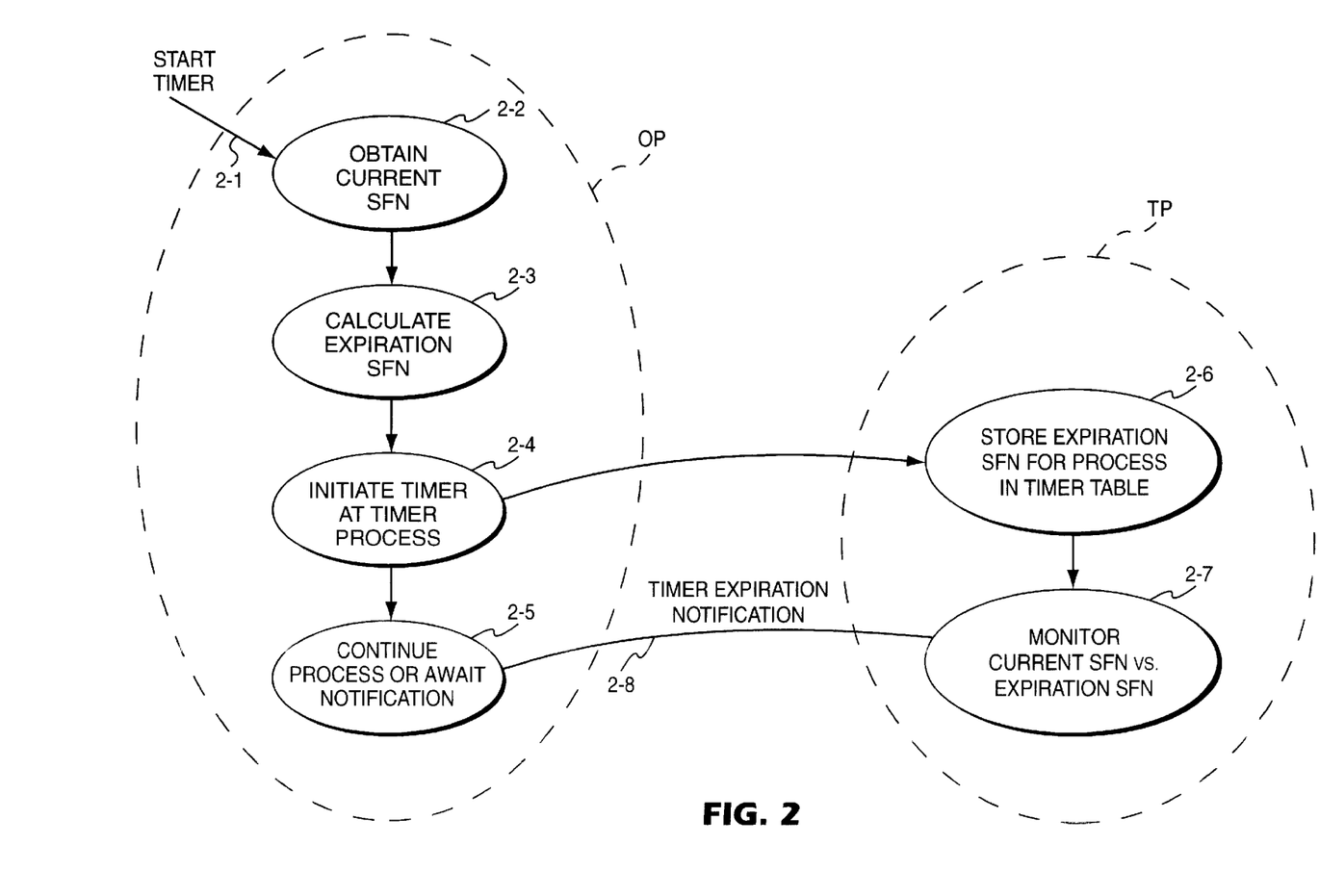
FIG. 2 is a diagrammatic view showing selected actions performed by an operational process and a timer process according to a mode of the invention.

FIG. 2 provides a basic overview showing selected actions performed by a general operational process OP and a timer process TP which are pertinent to the present invention. Actions performed by the operational process OP are framed by broken line OP; actions performed by the timer process TP are framed by broken line TP.

In the course of performing its operations germane to wireless telecommunication, the operational process OP is required to start a timer. The impetus to start the timer is reflected by action 2-1 in FIG. 2, and may arise either from external input or logic of the operational process OP. When the timer is to be started, as action 2-2 the operational process OP obtains the current system frame number (SFN) value. As mentioned above, in the illustrated embodiment the current system frame number (SFN) value is maintained by the timer process TP, which means that at action 2-2 the operational process OP requests and receives from the timer process TP the current system frame number (SFN) value. Such actual request and reception of the current system frame number (SFN) value is not illustrated as a separate action in FIG. 2, it being understood that such can be accomplished in various conventional ways, such as a function call between the processes, for example.

As action 2-3, the operational process OP computes or otherwise determines a future system frame number (SFN) value which corresponds to the actual clock time at which the timer is to time out (expire). The value computed at action 2-3 is considered to be an "expiration SFN", and is denoted as "SFN-ex". Since the actual amount of time (e.g., clock duration) required for the timer is known to the operational process OP, as well as the frequency of system frame number (SFN) pulses, the calculation/determination of SNF-ex at action 2-3 is relatively straightforward. Then, after having made such calculation/determination of SNF-ex, as action 2-4 the operational process OP initiates the timer with the timer process TP by providing the SFN-ex to the timer process TP, as depicted by action 2-4. After initiating the timer, as represented by action 2-5 the operational process OP either continues performing its operations (in expectancy of receiving an interrupt upon expiration of the timer) or suspends its operations (e.g., waits upon expiration of the timer).

Upon receipt of the expiration SFN (SFN-ex) from the operational process OP, as action 2-6 the timer process TP stores the SFN-ex for the timer in timer table 48 (see FIG. 1). As shown by action 2-7, the timer process TP monitors the current system frame number (SFN) value [it being recalled that the timer process TP receives the SFN pulses from SFN oscillator 46 and maintains the SFN counter]. In its monitoring, the timer process TP detects when the current system frame number (SFN) value reaches the SFN-ex for the timer as stored in timer table 48. When the current system frame number (SFN) value reaches the SFN-ex for the timer, the timer process TP notifies the operational process OP of expiration of the timer, as represented by action 2-8 in FIG. 2. Upon receipt of the timeout notification of action 2-8, the operational process OP can perform whatever further operation is associated with the timer.

Thus, from the foregoing it is evident that the present invention does not use system clock information, e.g., clock information maintained in hidden fashion in the real time operating system, for timers. Rather, timeout values for timers are expressed as a future system frame number (SFN) value which corresponds to the system clock timeout value. There are numerous advantages of the techniques of the present invention, some of which are illustrated by a reset/resynchronization of redundant unit scenario described in example fashion below with reference to FIG. 3.

Figure 3:
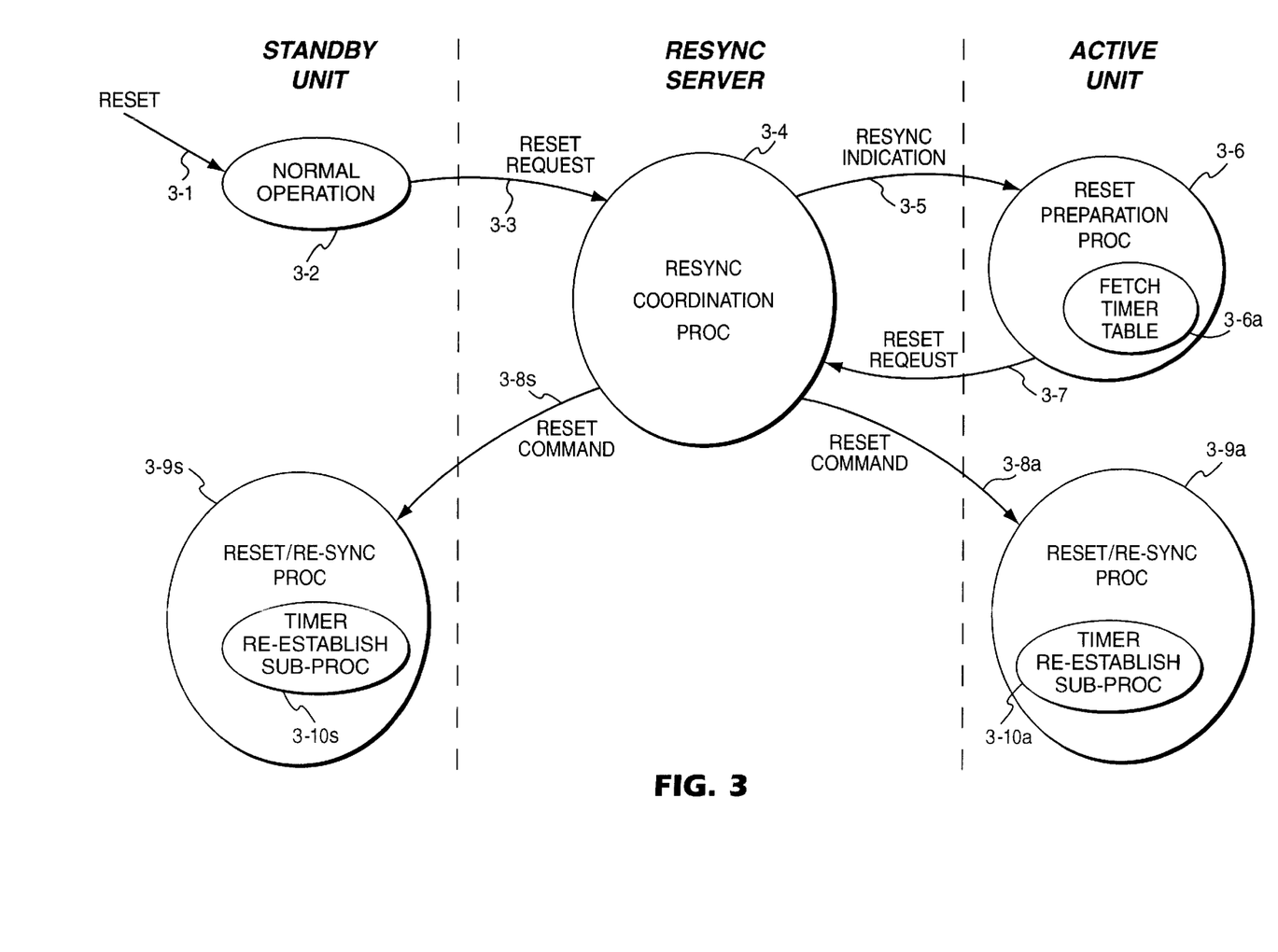
FIG. 3 is a diagrammatic view showing selected actions pertaining to resynchronization according to a mode of the invention.

FIG. 3 shows basic actions performed in connection with an example reset/resynchronization procedure for redundant units. The scenario of FIG. 3 is based, for example illustration purposes, on the architecture shown in FIG. 1. In this regard, for purposes of illustration the first unit 40 of FIG. 1 is denominated as the "active" unit and the second unit 42 is referenced as the "standby" unit. The scenario illustrated in FIG. 3 generally involves the standby unit (second unit 42) determining that it is out of synchronization, with the resynchronization server 44 resynchronizing both the active unit (first unit 40) and the standby unit (second unit 42). The actions illustrated in FIG. 3 are arranged in three columns delineated by two vertical broken lines, actions performed by the resynchronization server 44 being illustrated in the column between the two vertical broken lines; with actions performed by the standby unit (second unit 42) being situated in the left column and actions performed by the active unit (first unit 40) being situated in the right column.

An example reset/resynchronization procedure is illustrated as beginning with a determination that standby unit 42 is out of synchronization with active unit 40 (it being recalled that standby unit 42 provides redundancy for active unit 40). The out-of-synchronization determination is depicted by action 3-1 in FIG. 1, and can be a determination made, e.g., by standby unit 42, as standby unit 42 engages in the course of its normal operations as depicted by action 3-2 (e.g., operational process OP). Upon realization of the determination, as action 3-3 the standby unit 42 sends a reset request to resynchronization server 44. Upon receipt of the reset request from standby unit 42, as represented by action 3-4 the resynchronization server 44 enters its resynchronization coordination procedure.

In connection with its resynchronization coordination procedure, the resynchronization server 44 sends a resynchronization indication message (depicted by action 3-5). Upon receipt of the resynchronization indication message from resynchronization server 44, at shown by action 3-6 the active unit 40 enters a reset preparation procedure. As one aspect of the reset preparation procedure, the active unit 40 fetches the values in timer table 48 (as depicted by action 3-6a). Upon completion of its reset preparation procedure, the active unit 40 issues its own reset request message (represented by action 3-7) to resynchronization server 44. The reset request message of action 3-7 includes the timer table 48 fetched at action 3-6a.

Upon receiving the reset request message of action 3-7 from active unit 40, the resynchronization server 44 essentially simultaneously issues a reset command message both to standby unit 42 and active unit 40, the reset command message to standby unit 42 being shown as action 3-8s and the reset command message to active unit 40 being shown as action 3-8a in FIG. 3. Included in the reset command messages is the timer table 48 obtained from active unit 40. The reset command messages serve to initiate reset procedures for both the active unit 40 and standby unit 42, the reset procedures for standby unit 42 and active unit 40 being shown as-action 3-9s and action 3-9a, respectively, in FIG. 3. Further, the reset command messages apprise the standby unit 42 and active unit 40 of the contents of the timer table 48. Included in reset procedures for each of standby unit 42 and active unit 40 is a respective action or sub-procedure (3-10s, 3-10a) of re-establishing the timer table 48 for each unit. The timer re-establish subprocedures 3-10s and 3-10a obtain their initialization values from the reset command message (e.g., the timer table values obtained from the active unit 40 prior to reset).

If, in a particular system, the time to perform the reset and resync procedure (or to change from the active unit to the standby unit) is sufficiently slow and/or occurs at a critical time relative to an SFN timeout value, there must be some compensation or way to detect a timeout which would otherwise occur during the reset or switch. One technique for compensation is to associate an extra bit with each SFN value, and to toggle that bit every time the SFN is reset (e.g., as a result of the reset and resync procedure). Using this extra bit, the system can determine, after a reset or switch, that a timeout should have occurred during the switch. When such determination occurs, the timeout can be declared immediately following the reset or switch. The timeout is delayed by the time required to perform the switch or reset, but is nevertheless performed at the earliest possible opportunity thereafter.

The particular resynchronization coordination procedure of FIG. 3, in which both active unit 40 and standby unit 42 request reset, as well as various other detailed aspects of, and alternate system configurations for, the reset/resynchronization procedure for redundant units are described in or are understandable from U.S. patent application Ser. No. 09/257,233 filed Feb. 25, 1999, now patent U.S. Pat. No. 6,670,062, entitled "STATE SYNCRHONIZATION IN REDUNDANT SYSTEMS", which is incorporated by reference. However, such particular resynchronization coordination procedure is just one example of how resynchronization can occur, it being understood that alternate resynchronization procedures can also be employed as long as the SFN-based contents of the timer table 48 are re-established at a reset active unit.

Thus, advantageously the present invention facilitates recovery and use of timeout values for resynchronizing redundant units. The timeout values are not lost upon crashing and reset of any particular unit (as would occur when the timers are maintained by a real time operating system), but instead the SFN-based timeout values of the present invention are easily accessed, saved, and used for re-establishing the timeout values upon resynchronization.

Figure 1A:
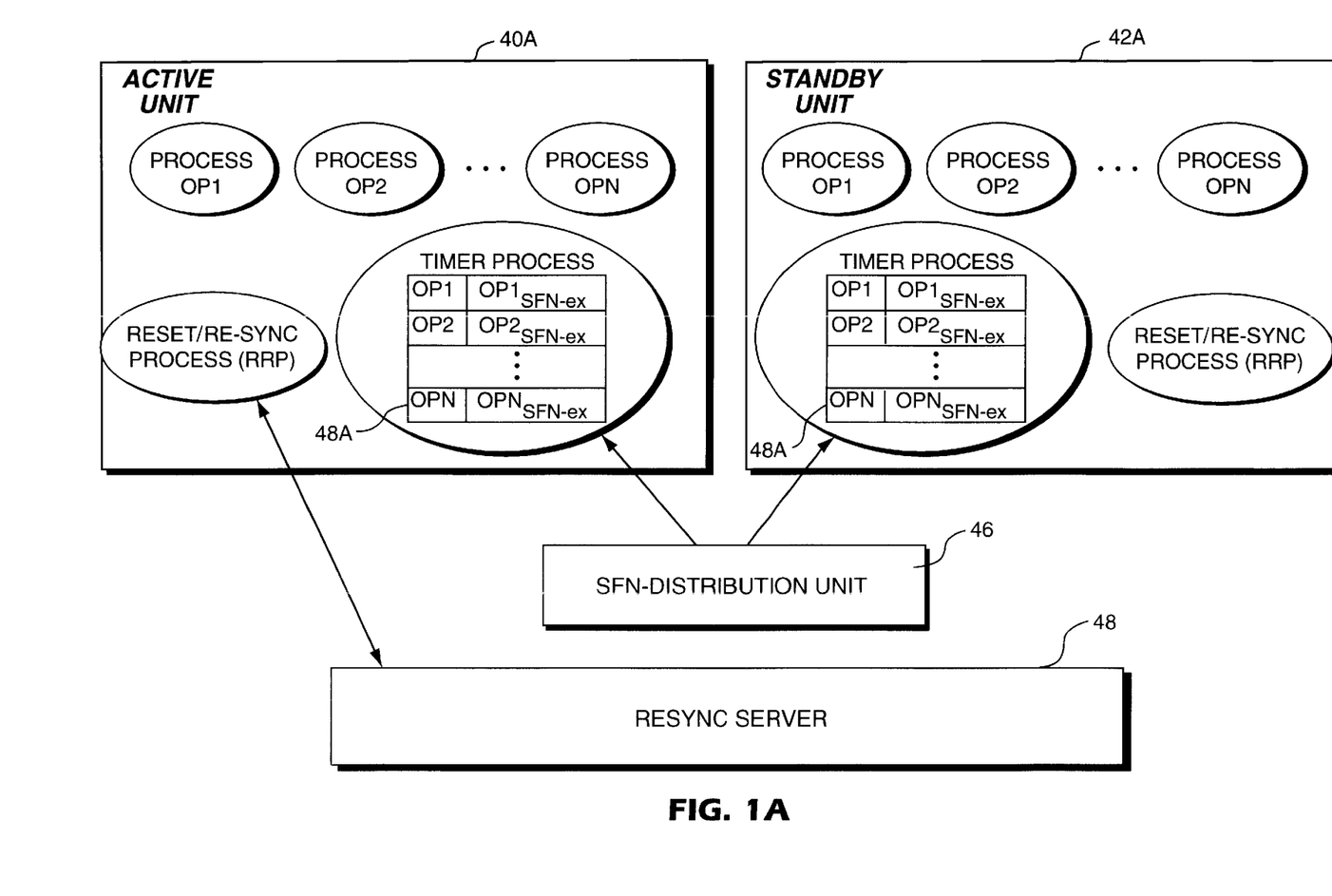
FIG. 1A is a schematic view of portions of a wireless telecommunications system according to another embodiment of the invention.

FIG. 1A is a schematic view of portions of a wireless telecommunications system according to another embodiment of the invention wherein active unit 40A performs plural operational processes OP1, OP2, . . . OPN, with standby unit 42A performed redundant corresponding plural operational processes OP1, OP2, . . . OPN. In the FIG. 1A embodiment, each operational process OPx has one or more timers which are posted in the timer table 48A of active unit 40A and in the timer table 48B of standby unit 42B. Execution of each of the operational processes OP1, OP2, . . . OPN resembles, in basic form, the actions depicted in FIG. 2, with each operational process determining when to initialize its timer(s) with its timer process TP. The timer table 48A of the timer process TP has one or more timer entries for each of the operational processes (for simplicity only one timer being shown in FIG. 1A for each operational process). When one of the units 40A, 42A requires reset, upon issuance of a resynchronization command (such as command 3-8 in FIG. 3, for example), the entire timer table 48A is re-established for the timer process TP of each unit. Moreover, the reset/resync process (which performs the reset/resync procedure) governs the resetting of each of the operational processes. In this regard, there may be a certain order for the restarting of the operational processes, as described (for example) in U.S. patent application Ser. No. 09/257,233 filed Feb. 25, 1999, now Pat. Ser. No. 6,670,462, entitled "STATE SYNCRHONIZATION IN REDUNDANT SYSTEMS", which is incorporated by reference.

Figure 4:
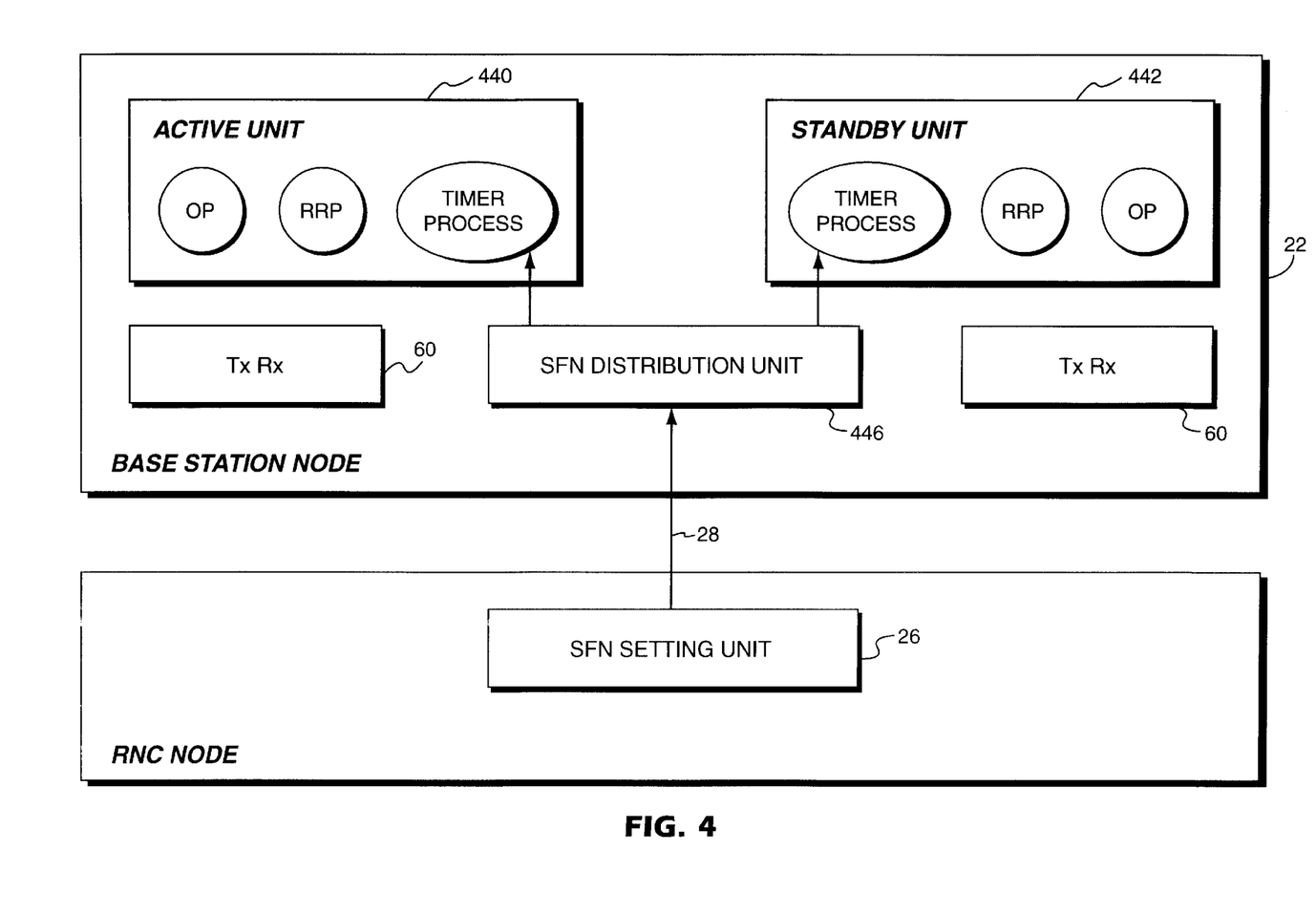
FIG. 4 is a schematic view showing the portions of the system of FIG. 1 in context of a base station node.

FIG. 4 is a schematic view showing the portions of the system of FIG. 1 (or of FIG. 1A) in context of a base station node 22 of a wireless telecommunications system. In particular, base station node 22 comprises active unit 440 and standby unit 442, as well as SFN oscillator (SFN distribution) unit 446. In addition, base station node 22 includes other units, such as plural transmitter/receiver (Tx/Rx) boards, two such Tx/Rx boards 60 being shown in example fashion in FIG. 4. The transmitter/receiver (Tx/Rx) boards are used for transmitting and receiving signals over the air interface with user equipment units (UEs). FIG. 4 also shows a radio network controller (RNC) node 24. Although the radio network controller (RNC) node 24 interacts in numerous ways with base station node 22 for accomplishing diverse objectives, an activity pertinent to the present invention is an SFN setting unit 26 of radio network controller (RNC) node 24 initializing or resetting an SFN value in a counter of SFN oscillator 446, as basically depicted by arrow 28 in FIG. 4.

In the context of base station node 22, there are diverse functions which can be performed by the operational process(es) of active unit 440 and its redundant standby unit 442. For example, the active unit 440 (and standby unit 442) may serve as a main processor or main controller for the base station node 22. Alternatively, the active unit 440 (and standby unit 442) may perform various power control functions relative to transmissions over the air interface (e.g., measurements of received signal strength, calculation of signal-to-noise ratios, etc.). Virtually any function required at base station node 22 can be performed by active unit 440 (and standby unit 442).

It will be appreciated that details of the base station node 22 can be implemented in various ways. For example, in one embodiment base station node 22 includes an unillustrated ATM switch which routes ATM cells between constituent units of base station node 22. In such embodiment, each of the active unit 440 and standby unit 442 are located on board attached to ports of an ATM switch core. The boards for each of the active unit 440 and standby unit 442 have switch port interfaces interconnecting the ATM switch core with the active unit 440 and standby unit 442, respectively. Pulses from SFN oscillator 446 are routed directly to the the active unit 440 and standby unit 442 for use by the timer processes thereof. Other configurations of base station node 22 are indeed within the scope of the present invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A wireless communication system which utilizes system frame numbers upon which to base identification of frames of information transmitted by the communication system, the wireless communication system comprising:

a first unit which executes an operational process;

a second unit which executes the operational process in redundant manner with the first unit;

wherein the operational process sets a timer by computing an expiration system frame number to be used for determining a timeout value.

2. The apparatus of claim 1, further comprising a unit which distributes a current system frame number to the first unit and to the second unit.

3. The apparatus of claim 2, wherein the unit which distributes the current system frame number is an oscillator.

4. The apparatus of claim 1, further comprising a resynchronization server, and wherein upon resynchronization of the second unit the resynchronization server causes the expiration system frame number used for the timeout value for the first unit to be communicated to the second unit.

5. The apparatus of claim 1, further comprising, at each of the first unit and the second unit, a timer process which stores the expiration system frame number, which monitors a current system frame number, and which notifies the operational process when the current system frame number reaches the expiration system frame number.

6. The apparatus of claim 5, further comprising a unit which distributes a current system frame number to the first unit and to the second unit.

7. The apparatus of claim 6, wherein the unit which distributes the current system frame number is an oscillator.

8. The apparatus of claim 1, wherein the first unit executes plural operational processes and the second unit executes the plural operational processes in redundant manner with the first unit; the plural operational processes each setting a respective timer by computing a respective expiration system frame number to be used for determining a respective timeout value.

9. The apparatus of claim 8, further comprising, at each of the first unit and the second unit, a timer process which stores the respective expiration system frame number for the plural operational processes in a timer table, which monitors a current system frame number, and which notifies an affected one of the plural operational processes when the current system frame number reaches the respective expiration system frame number for the affected one of the plural operational processes.

10. The apparatus of claim 1, wherein the first unit and the second unit reside at a node of the wireless communications system.

11. The apparatus of claim 10, wherein the node is a base station node.

12. The apparatus of claim 10, wherein the node further comprises a unit which distributes a current system frame number to the first unit and to the second unit.

13. The apparatus of claim 12, wherein the unit which distributes the current system frame number is an oscillator.

14. The apparatus of claim 1, wherein at least one the first unit and the second unit is one of a processor and a state machine.

15. A wireless communication system comprising:
    first operational means for executing an operational process;
    second operational means for executing the operational process in redundant manner with the first means;
    means for distributing system frame numbers upon which to base identification of frames of information transmitted by the communication system;
    wherein the operational process sets a timer by computing an expiration system frame number to be used for determining a timeout value.

16. The apparatus of claim 15, wherein the means for distributing system frame numbers is an oscillator.

17. The apparatus of claim 15, further comprising resynchronization means which, upon resynchronization of the second operational means, causes the expiration system frame number used for the timeout value for the first operational means to be communicated to the second operational means.

18. The apparatus of claim 15, further comprising, at each of the first operational means and the second operational means, a timer process which stores the expiration system frame number, which monitors a current system frame number, and which notifies the operational process when the current system frame number reaches the expiration system frame number.

19. The apparatus of claim 15, wherein the first unit and the second unit reside at a same node of the wireless communications system.

20. The apparatus of claim 10, wherein the same node is a base station node.

21. A method of operating a wireless communication system wherein an operational process is executed at a first unit and in redundant manner at a second unit; the method comprising:
    utilizing system frame numbers upon which to base identification of frames of information transmitted by the communication system;
    setting a timer for the operational process by computing an expiration system frame number to be used for determining a timeout value.

22. The method of claim 21, further comprising distributing a current system frame number to the first unit and to the second unit.

23. The method of claim 21, further comprising, upon resynchronization of the second unit, communicating the expiration system frame number used for the timeout value for the first unit to be communicated to the second unit.

24. The method of claim 21, further comprising:
    maintaining, at each of the first unit and the second unit, a timer process;
    using the timer process for:
        storing the expiration system frame number,
        monitoring a current system frame number, and notifying the operational process when the current system frame number reaches the expiration system frame number.

25. The method of claim 21, further comprising situating the first unit and the second unit reside at a node of the wireless communications system.

26. The method of claim 21, further comprising situating the first unit and the second unit reside at a base station node of the wireless communications system.

* * * * *